(12) United States Patent
Sunagawa (10) Patent No.: US 8,902,689 B2
(45) Date of Patent: Dec. 2, 2014

(54) CONTROLLING ELECTRIC POWER SUPPLY TO A MEMORY IN AN IMAGE PROCESSING APPARATUS

(75) Inventor: Yuuki Sunagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 149 days.

(21) Appl. No.: 13/438,228

(22) Filed: Apr. 3, 2012

(65) Prior Publication Data

US 2012/0268779 A1     Oct. 25, 2012

(30) Foreign Application Priority Data

Apr. 21, 2011   (JP) ................................. 2011-095088

(51) Int. Cl.
*G11C 5/14*     (2006.01)
*G06K 15/00*    (2006.01)

(52) U.S. Cl.
CPC ................................. *G06K 15/4055* (2013.01)
USPC ........................................................ 365/227

(58) Field of Classification Search
CPC .................................................... G06F 1/3275
USPC .......... 358/1.16; 365/226, 227; 713/300, 320, 713/324
See application file for complete search history.

(56) References Cited

U.S. PATENT DOCUMENTS

| 6,260,151 B1 * | 7/2001 | Omizo et al. ................. 713/324 |
| 7,464,279 B2 * | 12/2008 | Motoyama .................... 713/320 |
| 2003/0145239 A1 * | 7/2003 | Kever et al. ................... 713/300 |
| 2008/0222434 A1 * | 9/2008 | Shimizu et al. ............... 713/300 |
| 2009/0235102 A1 * | 9/2009 | Koshika et al. ............... 713/324 |

FOREIGN PATENT DOCUMENTS

| JP | 2004-199339 | 7/2004 |
| JP | 2011-5812 | 1/2011 |

OTHER PUBLICATIONS

English Language Machine Translation of JP 2011-005812 to Machida.*

* cited by examiner

*Primary Examiner* — Eric A Rust
(74) *Attorney, Agent, or Firm* — Oblon, Spivak, McClelland, Maier & Neustadt, L.L.P.

(57) ABSTRACT

An image processing apparatus includes a memory provided with a first memory area and a second memory area, and a processor that stores program related data in the first memory area and image related data in the second memory area, separately. When the image processing apparatus is in an energy save mode, the processor shuts down electric power supply to the second memory area storing the image related data.

12 Claims, 6 Drawing Sheets

CONTROLLING ELECTRIC POWER SUPPLY TO A MEMORY IN AN IMAGE PROCESSING APPARATUS

CROSS-REFERENCE TO RELATED APPLICATIONS

This patent application is based on and claims priority pursuant to 35 U.S.C. §119 to Japanese Patent Application No. 2011-095088, filed on Apr. 21, 2011, in the Japan Patent Office, the entire disclosure of which is hereby incorporated by reference.

BACKGROUND

1. Field

The present invention generally relates to an apparatus and method of controlling electric power supply to a memory in an image processing apparatus, and a recording medium storing electric power supply control program.

2. Background

The recent image processing apparatus such as image forming apparatus operates in a plurality of operation modes such that it may be switched to an energy save mode when it is not in use to reduce electric power consumption. When the operation mode is switched to the energy save mode, various data stored in a dynamic memory such as a dynamic random access memory (DRAM) is transferred to a nonvolatile memory such as a hard disk. The DRAM is then switched to a self refresh mode in which the internal clock is inactivated, thus reducing electric power consumption by the apparatus.

On the other hand, in the recent portable device, electric power supply to a DRAM storing OS data regarding an operating system may be stopped after transferring the OS data to a nonvolatile memory, for example, as described in Japanese Patent Application Publication No. 2004-199339.

This technique of stopping electric power supply to the DRAM may be applied to the image processing apparatus to further reduce electric power consumption when the image processing apparatus is not in use. However, since the OS data in the DRAM is lost, the OS data that is transferred to the nonvolatile memory needs to be deployed onto the DRAM when the operation mode is switched from the energy save mode. This requires a longer time for the image processing apparatus to be operable again such that it would be inconvenient for the user. If the energy save mode is switched to the normal operation mode due to access by another apparatus through a network, a communication error may occur if a response from the image processing apparatus being accessed is slow.

SUMMARY

In view of the above, one aspect of the present invention is to provide an apparatus and method of controlling electric power supply to a memory in an image processing apparatus when the image processing apparatus is in an energy save mode, while achieving reduction in electric power consumption and improving operability for a user.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following examples described below referring to FIGS. 1 to 7, controlling electric power supply to a memory in an image processing apparatus is explained, when the image processing apparatus is implemented by an image forming apparatus 1 of FIG. 1.

Figure 1:
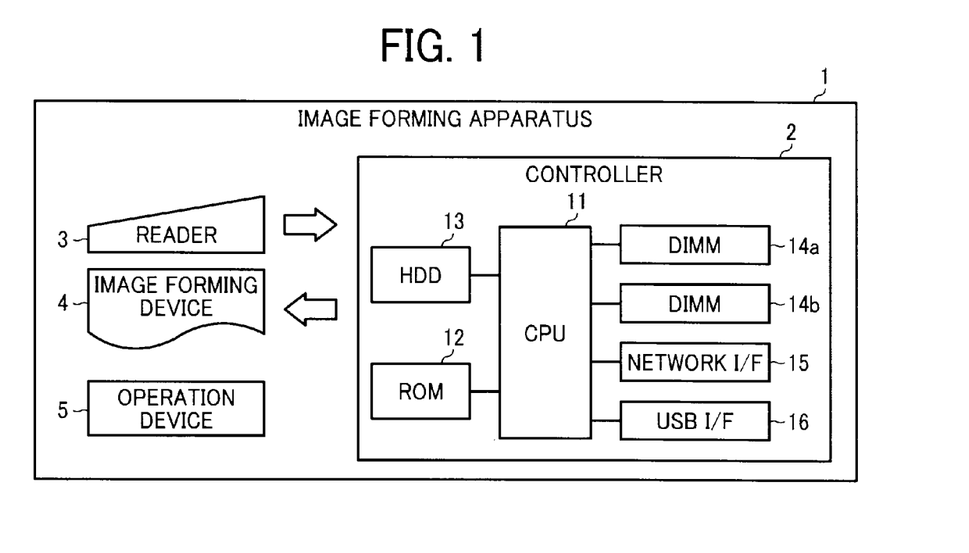
FIG. 1 is a schematic block diagram illustrating a structure of an image forming apparatus according to an example embodiment of the present invention.

Referring to FIG. 1, the image forming apparatus 1 includes a controller 2, a reader 3, an image forming device 4, and an operation device 5. The controller 2 includes a central processing unit (CPU) 11, a read only memory (ROM) 12, a hard disk drive (HDD) 13, and dual inline memory modules (DIMM) 14a and 14b, a network interface (I/F) 15, and a universal serial bus (USB) I/F 16. The image forming apparatus 1 operates in a plurality of operation modes including a normal operation mode and an energy save mode. When the image forming apparatus 1 is not in use for a predetermined time period, the image forming apparatus 1 is switched to the energy save mode to stop electric power supply to at least a portion of the image forming apparatus 1 to reduce electric power consumption by the apparatus 1.

The reader 3 is implemented by an image scanner including a charged coupled device (CCD) or an image scanner including a complementary metal oxide semiconductor (CMOS). The reader 3 scans an original document by scanning a document surface in main scanning and sub-scanning directions to generate scanned image data having a predetermined resolution. The original document may be transferred by an automatic document feeder (ADF), which may be mounted on the image forming apparatus 1, to an image reading section of the reader 3. Alternatively, the original document may be placed onto an exposure glass of the image forming apparatus 1 to be read by the reader 3. The scanned image data, which is red, green, blue (RGB) image data, is output to the controller 2.

The image forming device 4 forms an image on a recording sheet based on drawing data received from the controller 2, for example, using an electrophotographic method or an ink jet method. The drawing data is generated based on the scanned image data, or print data received from an outside apparatus through the network I/F 15. In case of forming an image using the electrophotographic method, the image forming device 3 includes an optical writing unit, a photoconductor, a charger, a developer, a transfer unit, and a cleaner. The image forming device 4 outputs a control signal to cause the optical writing unit to irradiate a laser light based on the drawing data toward a surface of the photoconductor, which is uniformly charged by the charger, to form a latent image thereon. The latent image is developed into a toner image with toner, which is applied by the developer. The image forming device 3 further transfers a recording sheet, which is fed by a sheet feeding device, to a nip formed between the photoconductor and the transfer unit. At the nip, the toner image is transferred from the photoconductor surface onto the recording sheet. The recording sheet having the toner image formed thereon is further conveyed to a fixing unit to be fixed by heat and pressure. The recording sheet having the fixed image thereon is discharged onto a sheet discharge tray.

The ROM 12 stores various programs that cause the CPU 11 to process and manage data or control various peripheral modules of the controller 2, and various data to be used when executing the programs. More specifically, the ROM 12 stores an image forming control program, which causes the CPU 11 to perform image forming operation using various devices in the image forming apparatus 1. The ROM 12 further stores an electric power supply control program that causes the CPU 10 to perform operation of controlling electric power supply to the DIMMs 14a and 14b to reduce electric power consumption in the energy save mode.

The CPU 11 controls various units or devices of the image forming apparatus 1 using the DIMMs 14a and 14b as a work memory, according to the programs stored in the ROM 12. For example, the CPU 11 controls various devices or units of the image forming apparatus 1 to perform image forming operation. The CPU 11 further controls switching of the operation mode between the normal operation mode and the energy save mode, and operation of the DIMMs 14a and 14b in the energy save mode, to control electric power consumption of the image forming apparatus 1.

The DIMMs 14a and 14b each function as a work memory of the CPU 11, a buffer that temporarily stores image data one page by one page, or a bit map memory where the drawing data is deployed. The image data may be scanned image data scanned by the reader 3, or print data received from the outside apparatus such as a host computer through the network I/F 15. The drawing data is a printing pattern, which is converted from the image data stored in the buffer. The DIMMs 14a and 14b each have a capacity that is large enough to store various data such as the image data, drawing data, or intermediate data, for a plurality of pages. For simplicity, the DIMMs 14a and 14b may be collectively referred to as the DIMM 14.

The HDD 13 stores various data such as image data and an operating system (OS) program under control of the CPU 11 in a manner that is not deleted even when the power of the image forming apparatus 1 is turned off.

The operation device 5 includes a plurality of keys such as a ten key, a start key, and a mode selection key. The operation device 5 further includes a display such as a liquid crystal display functioning as a touch panel. Through selection of the operation key or selection through the touch panel, the user is able to input a user instruction such as an instruction for printing. The display of the operation device 5 displays various information including the user instruction input through the operation key or notification to the user.

The network I/F 15 allows the image forming apparatus 1 to connect to the outside apparatus such as the host computer through a network such as a local area network (LAN). The network I/F 15 receives a control signal or data such as print data, which is transmitted from the host computer, or sends a status signal generated by the image forming apparatus 1 to the host computer.

The USB I/F 16 allows the image forming apparatus 1 to connect to an external device such as a computer terminal or a USB memory. The USB I/F 16 transmits or receives various data with the external device under control of the CPU 11.

Figure 2:
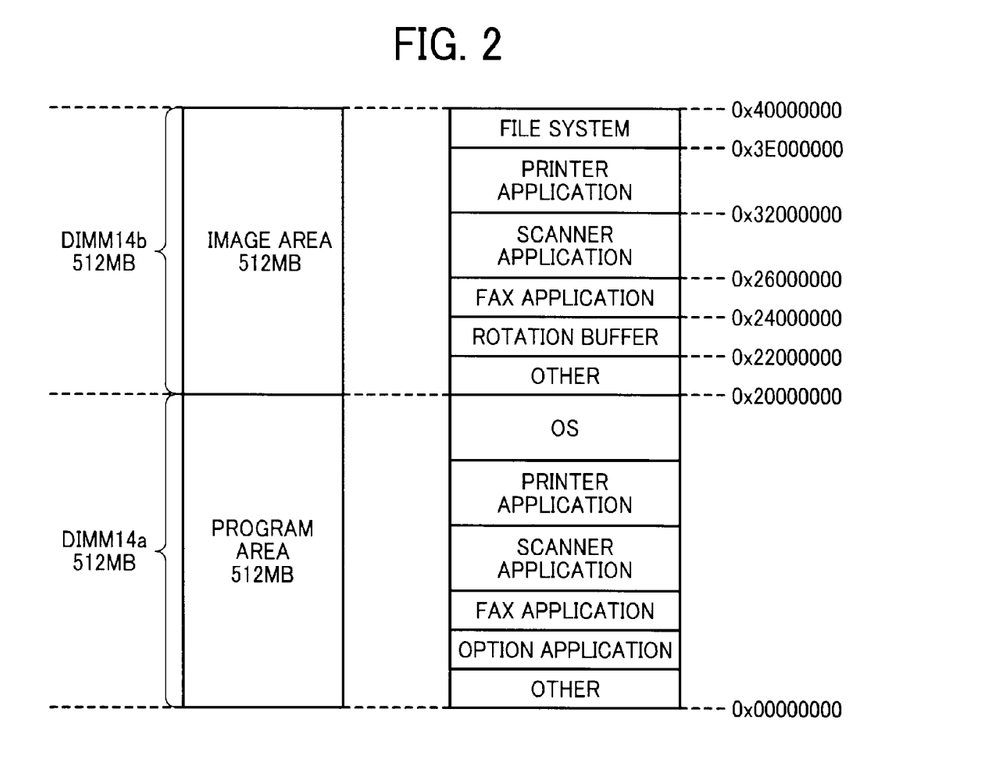
FIG. 2 is an example data structure of dual inline memory modules (DIMMs) of the image forming apparatus of FIG. 1, before an operation mode is switched to an energy save mode.

The DIMM 14 is a memory module having a plurality of Dynamic Random Access Memory (DRAM) chips mounted on a printed circuit. After execution of the image forming apparatus 1 and at least when the operation mode is not switched to the energy save mode, the CPU 11 stores various data being classified by data type, respectively, in the DIMM 14a and DIMM 14b as illustrated in FIG. 2.

More specifically, the CPU 11 uses the DIMM 14a as a program area to store therein various data to be used for execution of the OS program and an application program. In this example, the application program include, but not limited to, a printer application program, scanner application program, a facsimile application program, an optional application program, and the other application program. The CPU 11 uses the DIMM 14b as an image area or a data area to store therein various data relating to image data to be processed including, for example, file system data, printer application data, scanner application data, facsimile application data, rotation buffer data, or other kinds of memory data. The DIMM 14a, which functions as the program area, functions as a work memory area for various application programs.

The DIMM 14a functioning as the program area is previously set with a maximum capacity size for each of the OS and application programs, while a specific address storing each of the OS and application programs can be freely assigned. The DIMM 14b functioning as the image area is required to have a set of continuous physical addresses to allow high-speed Direct Memory Access (DMA) transfer. For this reasons, at the time of executing the image forming apparatus 1, the CPU 11 sets an address space of continuous physical addresses for each one of the file system data, the printer application data, the scanner application data, the facsimile application data, the rotation buffer data, and the other memory data, by setting a flag as illustrated in FIG. 2. The addresses for these data are not changed after execution.

Figure 3:
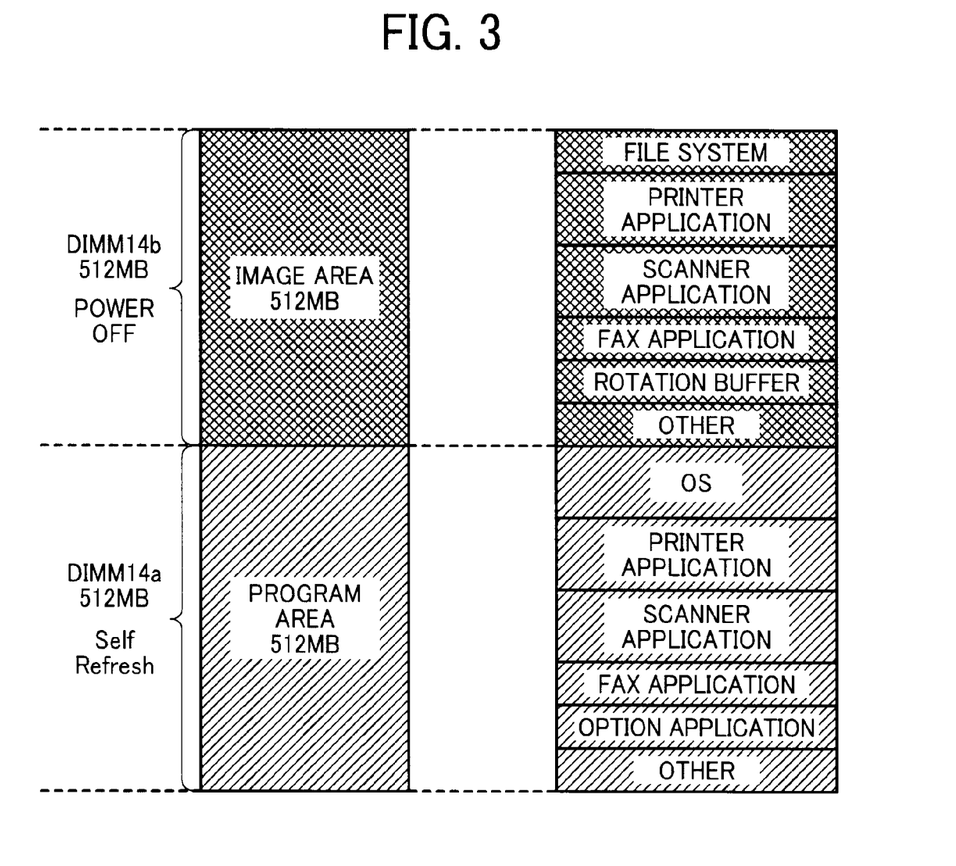
FIG. 3 is an example data structure of DIMMs of the image forming apparatus of FIG. 1, after the operation mode is switched to the energy save mode.

As illustrated in FIG. 3, after the operation mode is switched to the energy save mode, the CPU 11 causes the DIMM 14a functioning as the program area to be in a self refresh mode, and stops electric power supply to the DIMM 14b functioning as the image area.

Figure 4:
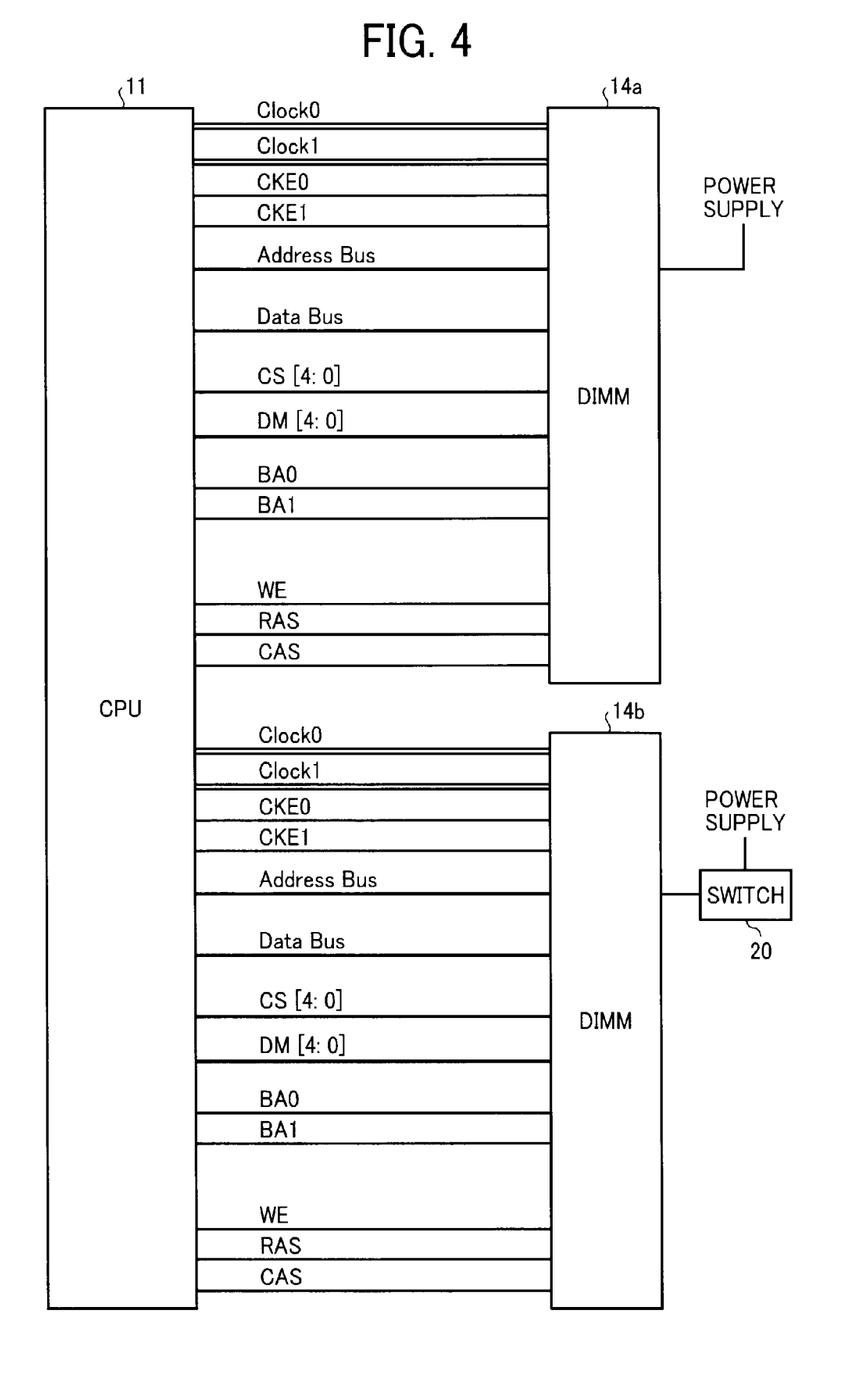
FIG. 4 is an example circuit structure illustrating the connections between a central processing unit and the DIMMs of the image forming apparatus of FIG. 1.

As illustrated in FIG. 4, the CPU 11 is connected to the DIMM 14a and the DIMM 14b, respectively, through two types of signal lines including a first type of signal lines that transmit control signals for refreshing and a second type of signal lines that transmit control signals for storing data. The first type of signal lines include a clock signal Clock0, a clock signal Clock1, a timing signal CKE0, and a timing signal CKE1. The second type of signal lines include an address bus, a data bus, and control signals CS, DM, BA0, BA1, WE, RAS, and CAS. Through outputting control signals through these signal lines, the CPU 11 causes the DIMM 14a to be in the self refresh mode and the DIMM 14b to turn off the power in the energy save mode.

Figure 5:
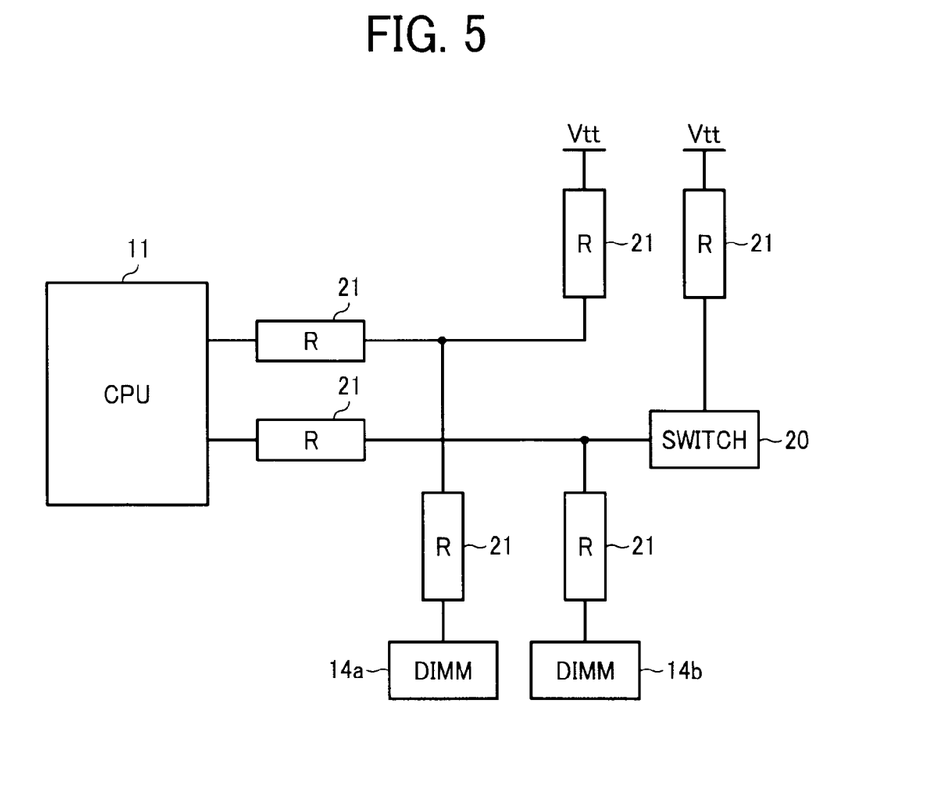
FIG. 5 is an example circuit structure illustrating a bus switch provided in one of the DIMMs of FIG. 4.

As illustrated in FIGS. 4 and 5, a switch 20, which may be implemented by a field effect transistor (FET), is provided between an electric power source Vtt and the DIMM 14. As illustrated in FIG. 5, a plurality of resistors 21 is provided in the controller 2. In the energy save mode, the control signal from the CPU 11 causes the switch 20 to stop electric power supply received from the electric power source Vtt, such that electric power is not supplied to the DIMM 14b. The switch 20 prevents electric currents from flowing into the data bus line, the address bus line, and the control signal lines, thus securing data.

Figure 6:
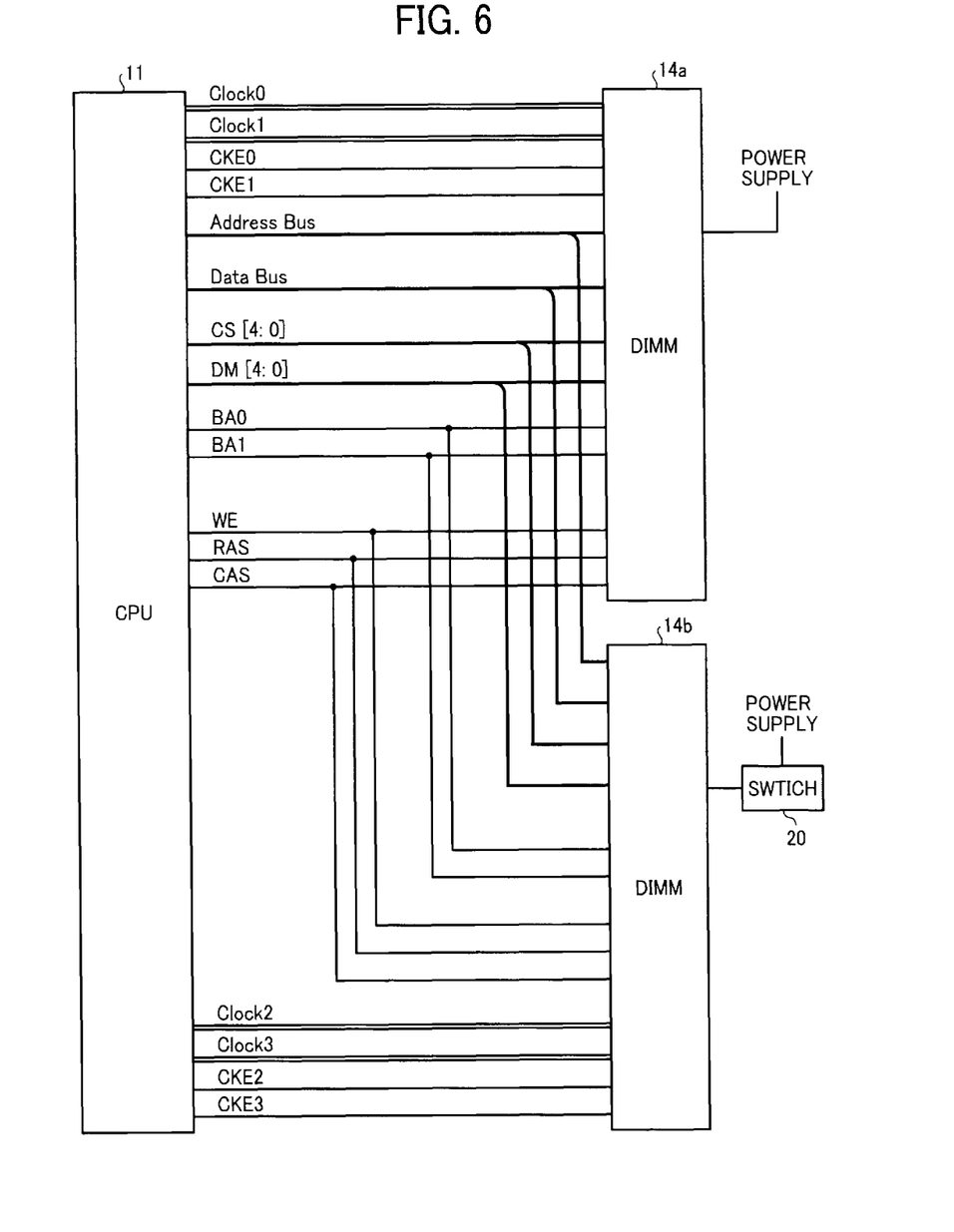
FIG. 6 is an example circuit structure illustrating the connections between the central processing unit and the DIMMs of the image forming apparatus of FIG. 1.

In another example, the CPU 11 may be connected to the DIMM 14a and the DIMM 14b, through signal lines for refreshing and signal lines for storing data as illustrated in FIG. 6. Referring to FIG. 6, the signal lines that are used for refreshing include clock signal lines Clock0, Clock1, Clock2, and Clock3, and timing signal lines CKE0, CKE1, CKE2, and CKE3. These clock signal lines and timing signal lines, which are the first type of signal lines provided for refreshing, are provided for each one of the DIMM 14a and the DIMM 14b, respectively. The signal lines that are used for storing data include an address bus line, a data bus line, and control signal lines CS, DM, BA0, BA1, WE, RAS, and CAS. These address bus and data bus lines and control signal lines, which are the second type of signal lines provided for storing data, are commonly shared by the DIMM 14a and the DIMM 14b. With this circuit structure, the CPU 11 controls signals of the clock signal lines and the timing signal lines, separately, for the DIMM 14a and the DIMM 14b. The CPU 11 controls signals of the address bus and data bus signal lines and the control signal lines, commonly, for the DIMM 14a and the DIMM 14b. In the energy save mode, the CPU 11 causes the DIMM 14a to be in the self refresh mode, and the DIMM 14b to turn off the power.

Figure 7:
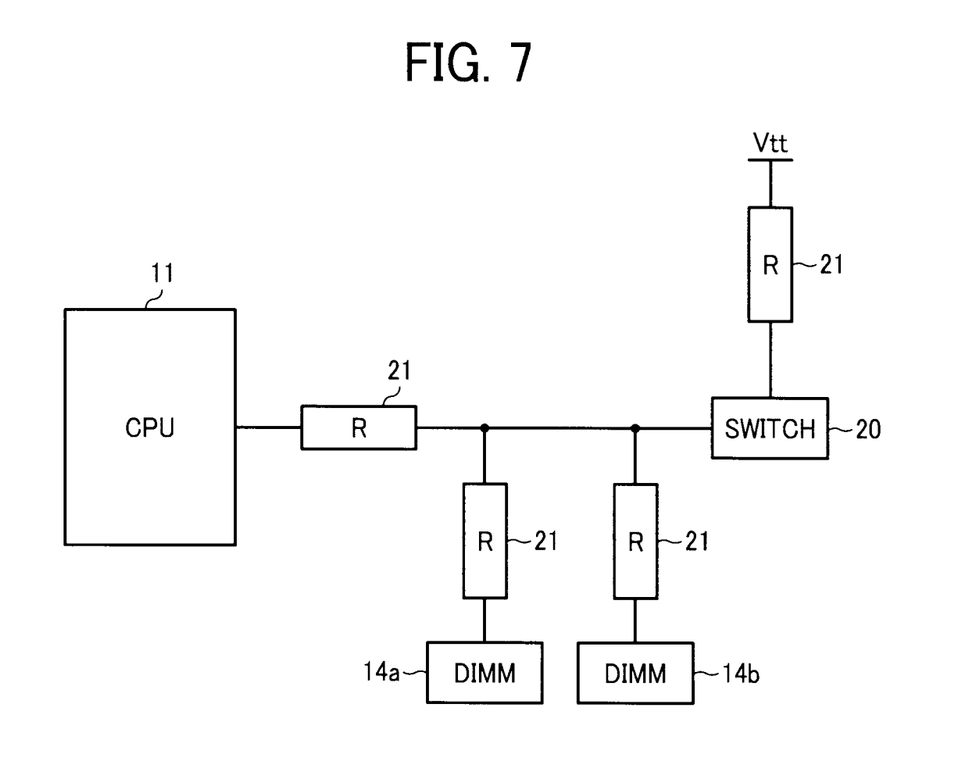
FIG. 7 is an example circuit structure illustrating a bus switch provided in one of the DIMMs of FIG. 6.

As illustrated in FIGS. 6 and 7, a switch 20 is provided between an electric power source Vtt and the DIMM 14. As illustrated in FIG. 7, a plurality of resistors 21 is provided in the controller 2. In the energy save mode, the CPU 11 outputs a control signal that causes the switch 20 to stop electric power supply received from the electric power source Vtt, such that electric power is not supplied to the data bus line, the address bus line, and the control signal lines connected to the DIMM 14a and the DIMM 14b. The switch 20 prevents electric currents from flowing into the data bus lines, the address bus lines, and the control signal lines, thus securing data.

Now, operation of controlling electric power consumption using the DIMM 14, performed by the CPU 11, is explained according to an example embodiment of the present invention. More specifically, in the energy save mode, electric power consumption is reduced while still keeping user operability of the image forming apparatus 1 relatively high.

As described above, upon execution of the CPU 11, the electric power supply control program stored in the ROM 12 is loaded to cause the CPU 11 to perform operation of controlling electric power supply. The electric power supply control program may be stored in any desired memory including, for example, ROM, EEPROM, EPROM, flash memory, flexible disk, CD-ROM, CD-RW, DVD, SD card, MO, etc. Further, the electric power supply control program may be written in any desired computer programming language such as legacy programming language including assembler, C, C++, C#, Java, etc., or object oriented programming language. Further, a recording medium storing the electric power supply control program may be distributed as a computer product. Alternatively, the electric power supply control program may be downloaded from any device connected through a network.

When the image forming apparatus 1 is in the normal operation mode, the CPU 11, which stores the OS program and various application programs in the DIMM 14a, executes a desired program to control various devices or units of the image forming apparatus 1 to perform specific operation according to the executed program. The processing results obtained through executing the program, such as image data subjected for processing or processed image data, is stored in the DIMM 14b.

For example, when a user instruction for scanning is received, the scanner application program is executed from the DIMM 14a. The scanned image data, which is obtained through scanning, is stored in the scanner application data in the DIMM 14b.

The CPU 11 causes the image forming apparatus 1 to switch from the normal operation mode to the energy save mode, for example, when the image forming apparatus 1 is not in use for a predetermined time period that is previously set. Alternatively, the image forming apparatus 1 may be switched to the energy save mode according to a user instruction for switching to the energy save mode.

When the image forming apparatus 1 in the energy save mode, electric power supply to a selected portion of the image forming apparatus 1 is stopped, thus reducing electric power consumption of the image forming apparatus 1. For example, electric power supply to the reader 3 and the image forming device 4 may be stopped. Further, as described below, in the energy save mode, the CPU 11 controls operation of the DIMM 14a and the DIMM 14b so as to cause the image forming apparatus 1 to switch to the normal operation mode for a shorter time period, while still suppressing electric power consumption.

As illustrated in FIG. 2, the CPU 11 causes one of the DIMMs 14 to function as the program area, and the other one of the DIMMs 14 to function as the image area. In the normal operation mode, the CPU 11 stores various data in the DIMM 14 such that data are stored in corresponding one of the DIMMs 14a and 14b as classified by data type. More specifically, the CPU 11 stores the OS program and various application programs including the printer application program, scanner application program, facsimile application program, optional application program, and other application program, in the DIMM 14a functioning as the program area. The CPU 11 stores the file system, printer application data, scanner application data, facsimile application data, rotation buffer data, and other memory data in the DIMM 14b functioning as the image area.

When the operation mode is switched to the energy save mode, as illustrated in FIG. 3, the CPU 11 causes the DIMM 14a to be in the self refresh mode, and the DIMM 14b to turn the power off by stopping electric power supply to the DIMM 14b.

When the DIMM 14a is in the self refresh mode, the internal clocks are inactivated such that electric power consumption of the DIMM 14a is suppressed. Further, since electric power consumption to the DIMM 14b is stopped, electric power consumption of the DIMM 14b is suppressed to about 0.

The CPU 11 switches the operation mode from the energy save mode to the normal operation mode, based on a detection result indicating detection of access from the outside apparatus through the network I/F 15, detection of the original document to be read by the reader 3, detection of a user instruction input through the operation device 5, etc. When the operation mode is switched to the normal operation mode, the CPU 11 starts supplying electric power to the DIMM 14b. The CPU 11 resets the DIMM 14 based on initial settings. Since the DIMM 14a functioning as the program area is in the self refresh mode, the OS program and various application programs are kept being stored such that the CPU 11 does not have to deploy the OS and application programs again. This results in reducing a time needed for switching from the energy save mode to the normal operation mode, thus increasing operability for the user. For example, when a user instruction for printing is received when the image forming apparatus 1 is in the energy save mode, the CPU 11 is able to immediately use the DIMM 14b functioning as the image area, based on the OS and application programs stored in the DIMM 14a. Even when the image forming apparatus 1 is switched to the normal operation mode due to detection of access from the outside apparatus through the network I/F 15, the image forming apparatus 1 is able to immediately respond to such access without causing a communication line to be disconnected in error.

Further, as illustrated in FIGS. 5 and 7, the switch 20 is provided between an electric power source and the DIMM 14b to suppress electric currents from flowing into the data bus line, address bus line, and control signal lines, thus improving reliability of the device.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an image processing apparatus including: storage means provided with a plurality of storage means each being independently supplied with electric power; storage control means for storing, in the plurality of storage means, program related data including a program that causes the apparatus to perform operation and data related to the program, and image related data including image data to be processed and data related to the image data, separately; and electric power control means for shutting down electric power supply to the storage means that stores the image related data when the apparatus is in an energy save mode.

In one example, the plurality of storage means corresponds to a plurality of memories or memory areas such as the DIMMs 14a and 14b. The storage control means and the electric power control means correspond to a processor such as the CPU 11. The CPU 11 stores the program related data including the program causing the apparatus to perform operation and data related to the program, and image related data including image data to be processed and data related to the image data, separately, in the DIMMs 14a and 14b. In the energy save mode, the CPU 11 shuts down electric power supply to the DIMM 14b storing the image related data. This reduces electric power consumption by the DIMM 14b. Since the program related data is kept stored in the DIMM 14a, when the operation mode is switched to the normal operation mode, the OS or the application program stored in the DIMM 14a does not have to be deployed, thus reducing a time required for switching to the normal operation mode.

In the image processing apparatus, the storage means includes a storage means that is periodically refreshed to keep data being stored. In the energy save mode, the electric power control means causes the storage means that stores the program related data to switch to a self refresh mode. Since electric power consumption by the DIMM 14a storing the program related data is reduced as it is in the self refresh mode, electric power consumption in the energy save mode is further reduced.

In the image processing apparatus, the electric power control means is connected to the plurality of storage means through a plurality of types of signal lines including a first type of signal lines that control storing of data and a second type of signal lines that control refresh operation. In one example, the signal lines that control storing of data and the signal lines that control refresh operation are connected separately for each one of the plurality of storage means. This allows the processor to easily control electric power supply to the storage means storing the image related data.

In another example, the signal lines that control storing of data are commonly shared among the plurality of storage means, and the signal lines that control refresh operation are connected separately for each one of the plurality of storage means. Since the signal lines that control storing of data can be shared, manufacturing costs may be reduced.

In another example, the electric power control means determines whether a request for image processing is received, and when the request is not received for a predetermined time period, the electric power control means shuts down electric power supply to the storage means storing the image related data. For example, even when the operation mode is not switched to the energy save mode, if the CPU 11 determines that the DIMM 14b functioning as the image area is not needed, the CPU 11 may stop electric power supply to the DIMM 14b.

In another example, when executing the image processing apparatus, the storage control means determines a memory area to be used to set an unused memory area. The electric power control means shuts down electric power supply to the unused memory area that is set by the storage control means. For example, the CPU 11 may determine a memory area to be used to set an unused memory area when executing the image forming apparatus 1, and shuts down electric power supply to the unused memory area. In one example, when the CPU 11 determines that the facsimile function is not provided by the image forming apparatus 1, but the DIMM 14 is provided with a memory area for the facsimile application, the CPU 11 may set the memory area provided for the facsimile application to an unused memory area.

The above-described image processing apparatus may be implemented by an image forming apparatus, which forms an image based on image data processed by the image processing apparatus.

In one example, the present invention may reside in a method of controlling electric power supply to an image processing apparatus, the method including: storing, in a plurality of storage means each being independently supplied with electric power, program related data including a program that causes the apparatus to perform operation and data related to the program, and image related data including image data to be processed and data related to the image data, separately; and shutting down electric power supply to the storage means that stores the image related data when the apparatus is in an energy save mode.

In one example, the present invention may reside in a recording medium storing a plurality of instructions which, when executed by a processor, cause the processor to perform the above-described method of controlling electric power supply.

What is claimed is:

1. An image processing apparatus, comprising:
a memory provided with a first memory area and a second memory area separate from the first memory area;
a switching device provided between an electric power source that supplies electric power to the memory and the second memory area, and
a processor configured to:
store program related data including a program that causes the image processing apparatus to perform at least one specific operation and data related to the program in the first memory area, and image related data including image data to be processed by the processor and data relating to the image data in the separate second memory area when the image processing apparatus is in a normal operation mode; and
shut down electric power supply to the second memory area storing the image related data using the switching device to stop supplying electric power received from the electric power source when the image processing apparatus is in an energy save mode, wherein
the memory is a dynamic memory that is periodically refreshed to keep data being stored therein and the image processing apparatus further comprises a resistor provided between the power source and the switching device.

2. The image processing apparatus of claim 1, wherein the memory area is periodically refreshed to keep data being stored therein, and the processor causes the first memory area that stores the program related data to switch to a self refresh mode when the image processing apparatus is in the energy save mode.

3. The image processing apparatus of claim 2, further comprising:
a first type of signal lines that connect the processor and the memory to transmit signals that control refresh operation of the memory from the processor; and
a second type of signal lines that connect the processor and the memory to transmit signals that control storing of data from the processor,
wherein the first type of signal lines are separately provided for each one of the first memory area and the second memory area, and the second type of signal lines are separately provided for each one of the first memory area and the second memory area.

4. The image processing apparatus of claim 2, further comprising:
a first type of signal lines that connect the processor and the memory to transmit signals that control refresh operation of the memory from the processor; and
a second type of signal lines that connect the processor and the memory to transmit signals that control storing of data from the processor,
wherein the first type of signal lines are separately provided for each one of the first memory area and the second memory area, and the second type of signal lines are commonly shared at least in part by the first memory area and the second memory area.

5. The image processing apparatus of claim 2, wherein
the processor is further configured to determine whether a request for performing image processing is received, and when the request for performing image processing is not received for a predetermined time period, the processor shuts down electric power supply to the second memory area storing the image related data even when the image processing apparatus is not in the energy save mode.

6. The image processing apparatus of claim 2, wherein
the processor is further configured to determine a memory area to be used by the image processing apparatus to set an unused memory area of the memory when executing the image processing apparatus, and shuts down electric power supply to the unused memory area of the memory even when the image processing apparatus is not in the energy save mode.

7. The image processing apparatus of claim 1, wherein the program stored in the first memory area includes an operating system and a plurality of application programs, the plurality of application programs including at least one of: a scanner application program; a facsimile application program; and a printer application program.

8. The image processing apparatus of claim 1, wherein, when the image processing apparatus is switched from the energy save mode to the normal operation mode, the processor starts supplying electric power to the second memory area, and causes the processor to process a user request using the program related data that is kept stored in the first memory area.

9. The image processing apparatus of claim 1, further comprising:
a network interface to connect the image processing apparatus to a network.

10. The image processing apparatus of claim 1, further comprising:
an image forming device to form an image on a recording sheet based on image data processed by the processor.

11. A method of controlling electric power supply to a memory in an image processing apparatus, the memory being provided with a first memory area and a second memory area separate from the first memory area and the image processing apparatus further including a switching device provided between an electric power source that supplies electric power to the memory and the second memory area of the memory, wherein the memory is a dynamic memory that is periodically refreshed to keep data being stored therein, and the image processing apparatus further comprises a resistor provided between the power source and the switching device, the method comprising:

storing program related data including a program that causes the image processing apparatus to perform at least one specific operation and data related to the program in the first memory area, and image related data including image data to be processed by the processor and data relating to the image data in the second memory area when the image processing apparatus is in a normal operation mode; and     using the switching device to stop supplying electric power received from the electric power source to the second memory area storing the image related when the image processing apparatus is in an energy save mode.

12. A non-transitory recording medium storing a plurality of instructions which, when executed, cause a processor to perform a method of controlling electric power supply to a memory in an image processing apparatus, the memory being provided with a first memory area and a second memory area separate from the first memory area and the image processing apparatus further including a switching device provided between an electric power source that supplies electric power to the memory and the second memory area of the memory, wherein the memory is a dynamic memory that is periodically refreshed to keep data being stored therein, and the image processing apparatus further comprises a resistor provided between the power source and the switching device, the method comprising:

storing program related data including a program that causes the image processing apparatus to perform at least one specific operation and data related to the program in the first dynamic memory area, and image related data including image data to be processed by the processor and data relating to the image data in the second dynamic memory area, separately, when the image processing apparatus is in a normal operation mode; and     using the switching device to stop supplying electric power received from the electric power source to the second memory area storing the image related when the image processing apparatus is in an energy save mode.

\* \* \* \* \*